United States Patent [19]
Dekker et al.

[11] Patent Number: 6,033,462
[45] Date of Patent: Mar. 7, 2000

[54] MULTI-CHAMBERED AIR/OIL SEPARATOR

[75] Inventors: Jan D. Dekker, LaPorte; Rick-Jan Dekker, Michigan City, both of Ind.; Gerald G. Geenen, Glenwood, Ill.

[73] Assignee: Dekker Vacuum Technologies, Inc.

[21] Appl. No.: 09/107,944

[22] Filed: Jun. 30, 1998

[51] Int. Cl.[7] .................................................. B01D 19/00
[52] U.S. Cl. ................................. 95/248; 55/319; 55/322; 55/330; 55/423; 55/DIG. 17; 95/254; 95/266; 96/190; 96/191; 96/194
[58] Field of Search ........................... 55/DIG. 17, 319, 55/320, 322, 327, 330, 332, 421, 423; 96/188, 189, 190, 191, 192, 194, 182, 184, 186; 95/243, 247, 248, 252, 266, 254

[56] References Cited

U.S. PATENT DOCUMENTS

| | | |
|---|---|---|
| 3,016,977 | 1/1962 | Schweitzer et al. .................. 96/189 |
| 3,291,385 | 12/1966 | Williams et al. .................. 55/DIG. 17 |
| 3,917,474 | 11/1975 | Heckencamp et al. .................. 96/190 |
| 4,092,137 | 5/1978 | Howe et al. .................. 96/184 |
| 4,108,618 | 8/1978 | Schneider .................. 96/184 |
| 4,234,325 | 11/1980 | Rea .................. 55/319 |
| 4,359,329 | 11/1982 | Willeitner .................. 96/190 |
| 4,622,048 | 11/1986 | Roberts et al. .................. 96/188 |
| 4,668,252 | 5/1987 | Gerdau .................. 96/189 |
| 5,427,685 | 6/1995 | Thorley .................. 96/190 |
| 5,718,744 | 2/1998 | Ehlert .................. 96/189 |

*Primary Examiner*—Duane S. Smith
*Attorney, Agent, or Firm*—R. Tracy Crump

[57] ABSTRACT

An air/oil separator used with a closed loop oil seal system for a liquid ring vacuum pump, which incorporates a multi-chambered design for facilitating multiple stages of oil particulate separation is disclosed. The separator includes a cylindrical multi-chambered accumulator and a cylindrical filter housing, which supports a conventional filter element. The accumulator has an outer housing and an inner housing, which defines an outer reservoir chamber and an inner reservoir chamber. The accumulator also includes an inner oil conduit extending through the inner reservoir chamber, which deposits the oil discharge into the inner reservoir chamber. A perforated inner baffle is mounted within the inner housing to partially divide the inner reservoir chamber. A second outer baffle is mounted inside the outer reservoir chamber between the outer and inner housings to partially divide the outer reservoir chamber. The inner housing has a vent formed near the inlet (proximal) end of the separator, which allows oil mist to pass from the inner to the outer reservoir chamber.

16 Claims, 4 Drawing Sheets

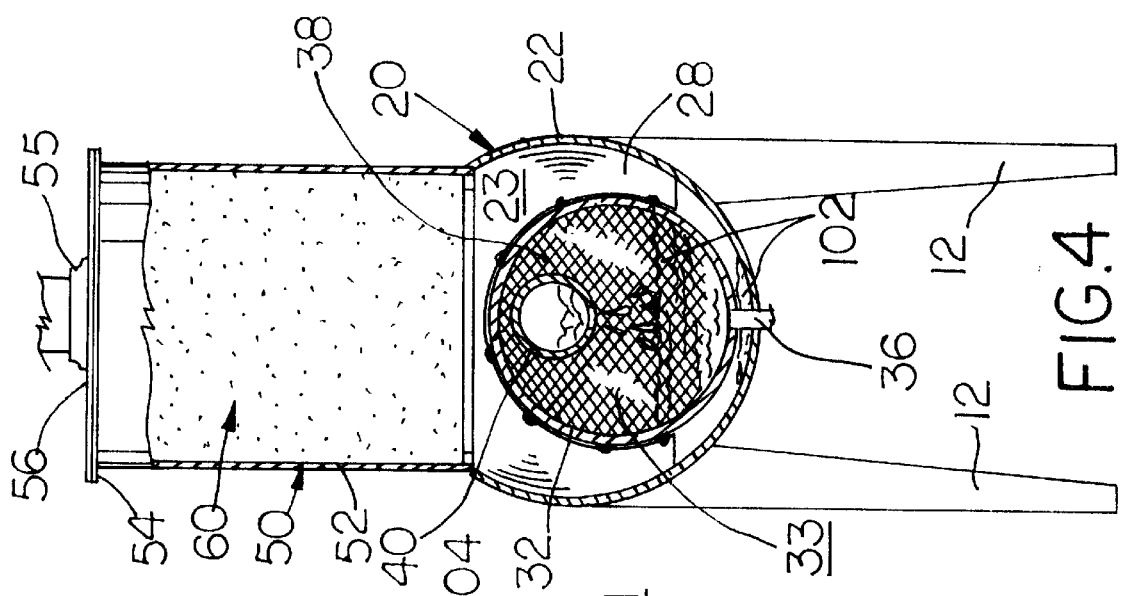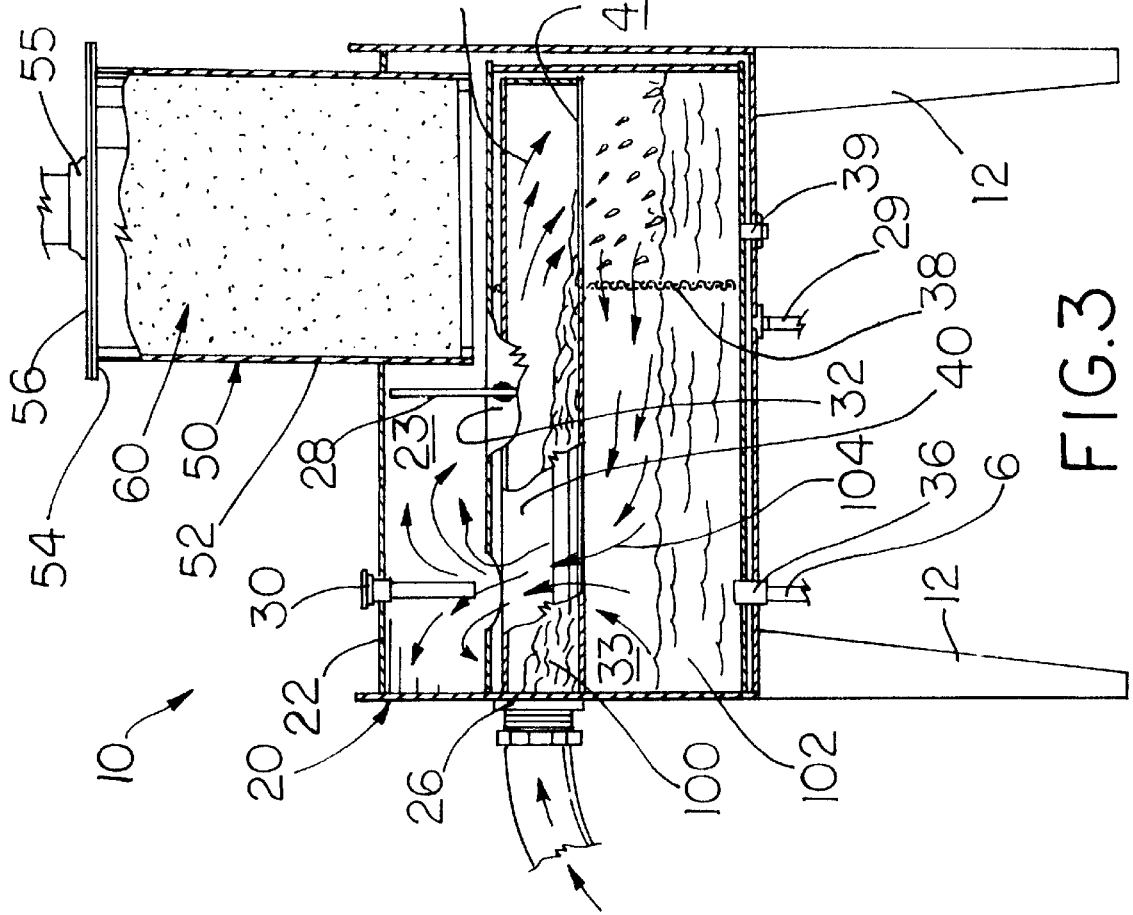

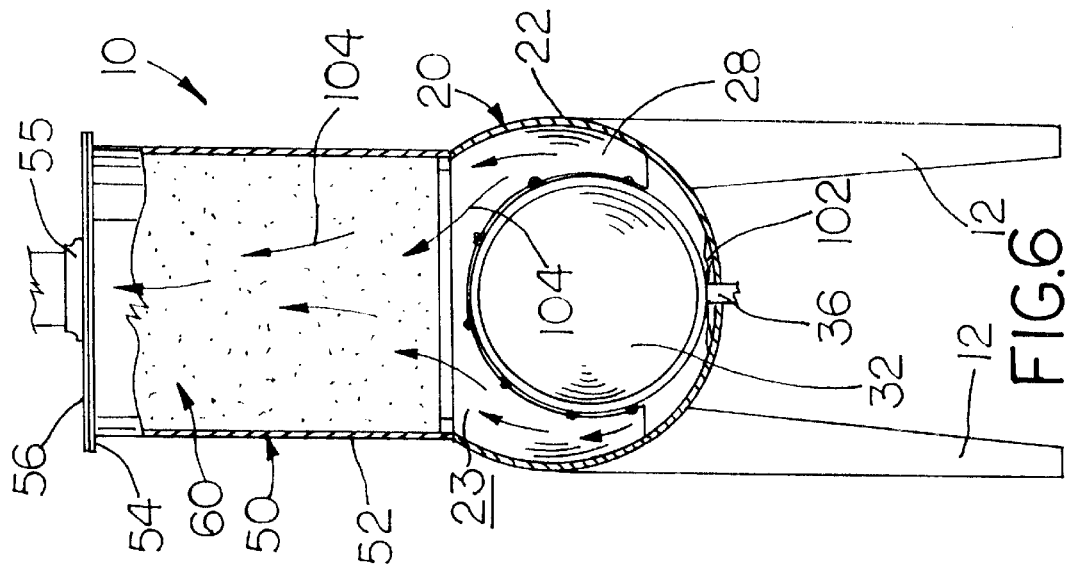
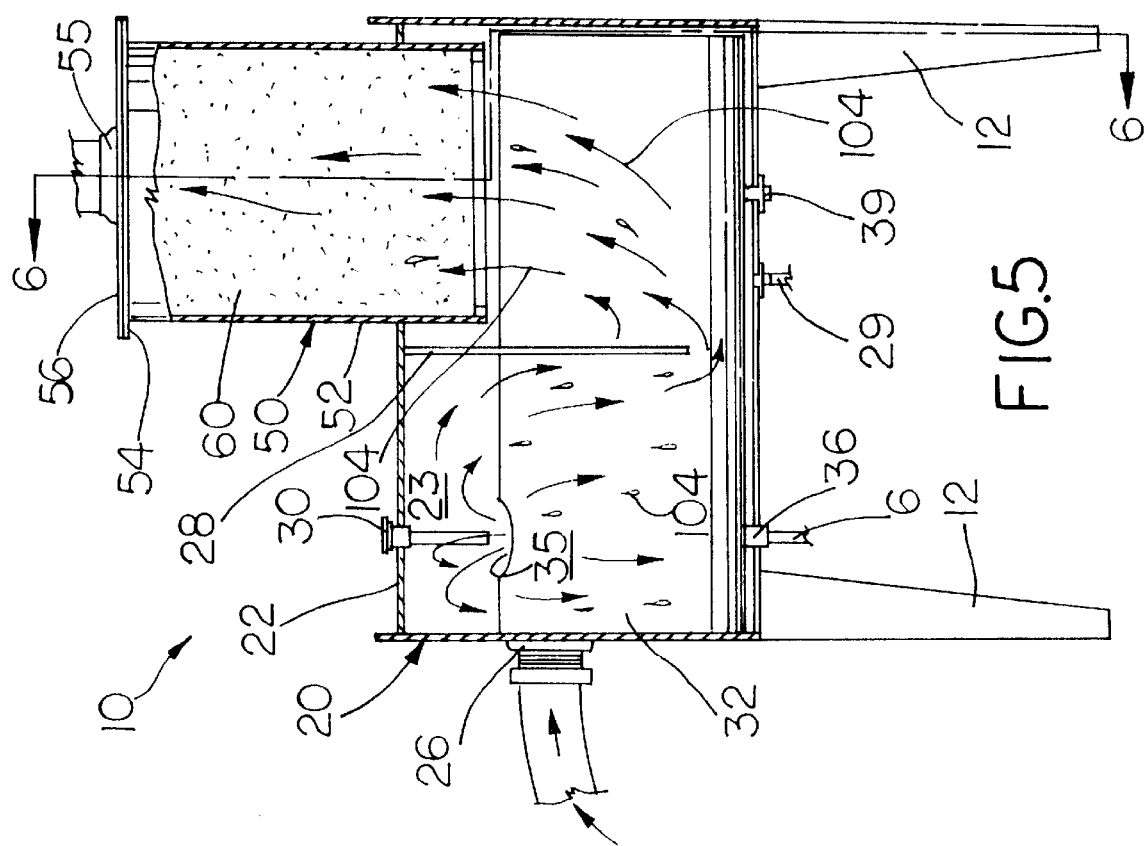

MULTI-CHAMBERED AIR/OIL SEPARATOR

This invention relates to air/oil separators used in closed loop oil seal systems for liquid ring vacuum pumps, and specifically an air/oil separator which incorporates a multi-chambered design for facilitating multiple stages of oil particulate separation.

BACKGROUND OF THE INVENTION

Vacuum pumps are used to create vacuum pressure for a variety of industrial applications. Most vacuum pump designs require internal lubrication; however, liquid ring vacuum pumps require no internal lubrication because there is no metal to metal contact between the rotating and stationary parts of the pump and the bearings are located external to the pumping chamber. The design of liquid ring vacuum pumps uses a multi-bladed impeller mounted on a shaft positioned eccentrically in a cylindrical pump housing. The pump housing is partially filled with a liquid sealant. Portplates with inlet and discharge openings are positioned on either side of the impeller. As the impeller rotates, the centrifugal force pushes the liquid sealant outward forming a liquid ring within the pump housing. The vacuum is created by the movement of the liquid outward inside the pump housing. The design of the liquid ring vacuum pump requires a continuous flow of fresh sealing liquid in the pump housing.

Liquid ring vacuum pumps typical use water as the sealing medium; however, the use of water has several drawbacks. In an open system, vacuum pumps can draw and discharge a continuous supply of fresh water from an external source. Environmental laws, restrictions on water usage, and the cost of water discharge disposal creates a need for a closed loop seal system, which recirculates the water. Recirculated water often picks up contaminants that can damage the pump. In addition, the water is heated in the operation of a liquid ring vacuum pump and must be cool before being recirculated back into the pump in a closed loop seal system. This necessitates the use of a heat exchanger in the seal system.

Waterless liquid ring vacuum pumps have been developed that use oil as the sealant. The use of oil as the sealant medium has several operational advantages over water, but it necessitates the use of a closed loop oil seal system. The operation of waterless liquid ring vacuum pumps, however, creates a significant oil separation problem for their oil seal systems. The rotation of the impeller inside the pump creates oil mist, which is a mixture of air and gaseous oil particulate. The oil mist is circulated through the closed loop oil seal system along with the oil discharge. Unlike oil mist, the water vapor created by the rotation of the impeller in a water based system can be simply vented into the atmosphere without significantly affecting the environment or the oil seal system. Consequently, oil seal systems for waterless liquid ring vacuum pumps must include air/oil separators, which separate the oil particulate contained in the oil mist from the air. The recaptured oil separated from the oil mist must be collected for recirculation, while the air is vented out of the system.

Heretofore, conventional air/oil separators have comprised simply a reservoir tank and a separate filter element. The reservoir tank collects the liquid oil from the oil discharge deposited into the separator from the vacuum pump, while the filter element collects the gaseous oil particulate from the oil mist in the oil discharge. Conventional filter elements use an oil absorbing composite fiber-glass mesh, in which the oil particulate coalesces. This type of air/oil separator often fails to remove a significant portion of the oil particulate from the oil mist. The failure is often due to the velocity of the oil discharge through the separator, and the shear volume of oil discharge deposited into the separators. The oil mist often passes through the separator too quickly to permit sufficient condensation within the reservoir tank and too quickly to coalesce an acceptable portion of the oil particulate within the filter element. Consequently, the inefficiency of conventional air/oil separators represents a significant environmental and health hazard, as well as an operational problem.

SUMMARY OF THE INVENTION

The air/oil separator of this invention has improved oil particulate separation over conventional separators. The separator uses a multi-chambered accumulator design in addition to a conventional filter element, which creates multiple stages of oil particulate separation. In addition to using of gravitational force and the coalescing of oil particulate within the filter element, the separator of this invention improves oil condensation within the accumulator using the aerodynamic or thermodynamic conditions created by the multi-chambered design of the accumulator. The multi-chambered design of the accumulator enables a greater portion of the oil particulate to be condensed from the oil mist before passing through the filter element. The multi-chambered design restricts and slows the flow of oil mist through the inner and outer reservoir chambers, creates a difference in ambient temperatures between the inner and outer reservoir chambers and alters the direction of flow of the oil mist through the separator.

The air/oil separator includes a cylindrical accumulator and a cylindrical filter housing, which supports a conventional filter element. The accumulator has an outer housing and an inner housing, which defines an outer reservoir chamber and an inner reservoir chamber. The accumulator also includes an inner oil conduit, which extends through the inner reservoir chamber. The conduit has a longitudinal downward facing slot, which allows the oil discharge to be deposited into the inner reservoir chamber. A perforated inner baffle is mounted within the inner housing to partially divide the inner reservoir chamber. A second outer baffle is mounted inside the outer reservoir chamber between the outer and inner housings to partially divide the outer reservoir chamber. The inner housing has a vent formed near the inlet (proximal) end of the separator, which allows oil mist to pass from the inner to the outer reservoir chamber. The filter housing includes a cylindrical outer wall and a removable circular lid, which forms a housing for receiving a conventional filter element. The lid has an exhaust port, which vents the air into the atmosphere or into an exhaust system after the oil particulate has been recovered.

In operation, the heated oil discharged from the vacuum pump flows across the length of the separator through the inner conduit inside the inner reservoir chamber before being deposited in the inner chamber. Inside the inner reservoir chamber, the liquid oil settles across the bottom of the inner reservoir chamber, while the oil mist expands across the top of the inner reservoir chamber. The perforated baffle inside the inner reservoir chamber restricts and slows the flow of oil mist through the inner reservoir chamber. As oil mist pass through the perforated baffle, a portion of gaseous oil particles condenses and collects on the baffle. The liquid oil collected in the bottom of the inner housing is reintroduced into the oil seal system through an outlet port. The oil mist is eventually vented from the inner reservoir chamber into the outer reservoir chamber through the opening in the inner housing. Because the oil discharge is heated from pump, the collected liquid oil and oil mist creates a significantly higher ambient temperature inside the inner reservoir chamber than inside the outer reservoir chamber. Consequently, venting the hot oil smoke from the inner reservoir chamber into the cooler outer reservoir chamber results in additional condensation to remove more gaseous oil particles from the oil smoke. Once inside the outer reservoir chamber, the second baffle provides another structural mechanism, which restricts and slows the flow of oil mist through the inner reservoir chamber and which serves as a structure upon which oil particulate may condense. The oil particulate condensing in the outer reservoir chamber accumulates at the bottom of the chamber, where it will be reintroduce to the oil seal system. The remaining oil mist passes through the filter element to remove any remaining gaseous oil particles contained in the oil mist before the air is exhausted out the exhaust port.

Accordingly, an advantage of this invention is that the separator uses multiple stages of oil particulate separation.

Another advantage of this invention is that the separator uses a multi-chambered reservoir design, which facilitates oil separation and accumulation in an inner chamber and an outer chamber.

Another advantage of this invention is that the separator includes baffles that restrict and slow the flow of the oil mist through the separator to facilitate additional condensation of oil particles within the separator.

Another advantage of this invention is that when the oil mist is vented from the inner chamber to the outer chamber, the difference in ambient temperature between the inner and outer chambers further facilitates the condensation of the oil particulate.

Another advantage of this invention is that the multi-chambered reservoir design creates multiple direction changes for the flow of oil mist thereby improving oil particulate separation.

Other advantages will become apparent upon a reading of the following description.

BRIEF DESCRIPTION OF THE DRAWINGS

A preferred embodiment of the invention has been depicted for illustrative purposes only wherein:

FIG. 3 is a side sectional view of the separator showing the flow of the oil and oil smoke through the separator;

FIG. 4 is an end sectional view of the separator;

FIG. 5 is another side sectional view of the separator showing the flow of oil smoke through the outer chamber; and FIG. 6 is another end sectional view of the separator.

DESCRIPTION OF THE PREFERRED EMBODIMENT

The preferred embodiment herein described is not intended to be exhaustive or to limit the invention to the precise form disclosed. It is chosen and described to best explain the invention so that others skilled in the art might utilize its teachings.

Figure 1:
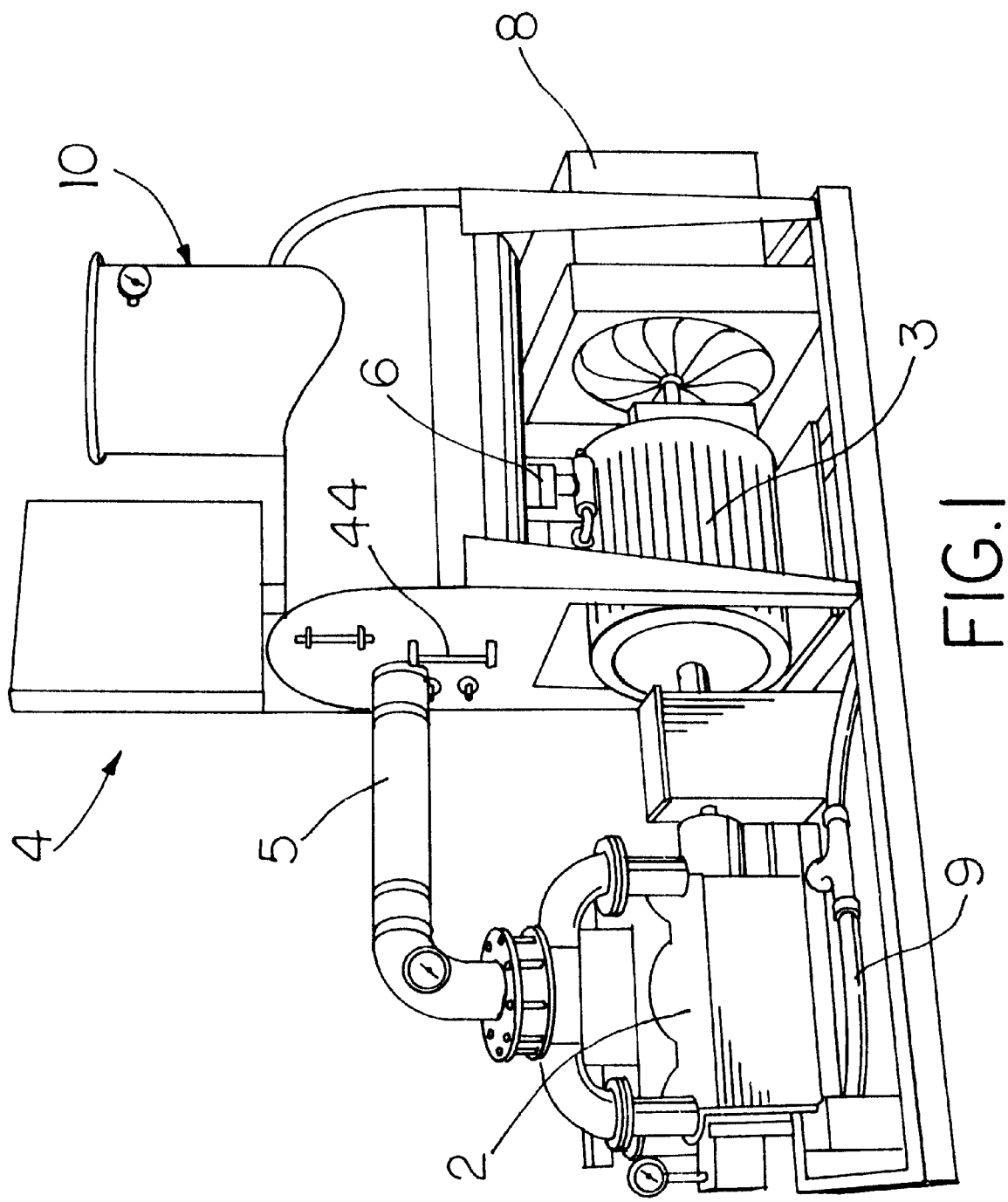
FIG. 1 is a perspective view of the separator of this invention used with a liquid ring vacuum pump and a closed loop oil seal system.
Figure 2:
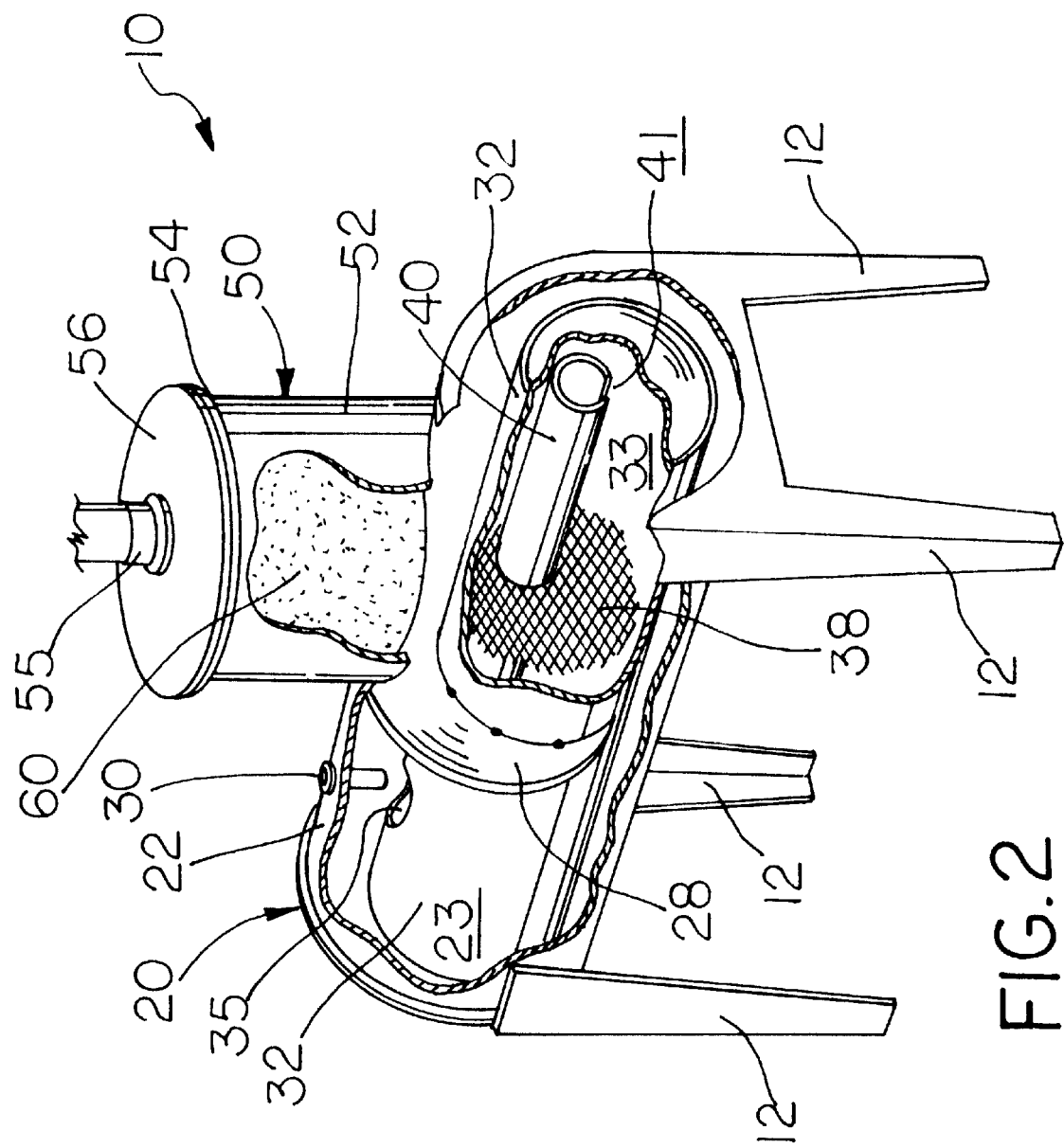
FIG. 2 is a perspective view of the separator of this invention having portions cut away to show the internal components.

FIG. 1 shows the air/oil separator 10 of this invention used as part of a closed loop oil seal system 4 for a waterless liquid ring vacuum pump 2, such as the type manufactured and distributed by Dekker Vacuum Technologies, Inc. of Michigan City, Ind. Vacuum pump 2 is connected to a drive motor 3. As shown, oil seal system 4 includes separator 10, a heat exchanger 8 and various fluid and air lines, valves, gauges and controls. An oil exhaust line 5 connects pump 2 to separator 10. A fluid line 6 connects separator 10 to heat exchanger 8. A sealant return line 9 from heat exchanger 8 returns oil to pump 2. In oil seal system 4, separator 10 separates and collects the liquid and gaseous oil discharge being exhausted from pump 2 for recirculation through heat exchanger 8 and back into the pump. Although illustrated in use with a liquid ring vacuum pump system, separator 10 can be used with any oil seal system regardless of its application.

Separator 10 is supported by four legs 12 and includes a cylindrical multi-chambered tank assembly or accumulator 20 and a cylindrical filter housing 50, which supports a filter element 60. As shown, accumulator 20 is oriented horizontally and filter housing 50 extends vertically from the distal end of the reservoir. The dimensions of the reservoir are determined by the particular application and may vary without altering the teachings of this invention.

Accumulator 20 includes a cylindrical outer reservoir housing 22 and an inner reservoir housing 32, which form an outer reservoir chamber 23 and an inner reservoir chamber 33. Outer housing 22 is formed by an outer cylinder wall and two outer end plates, and inner housing 32 is formed by an inner cylinder wall and an inner endplate. Accumulator 20 includes an inlet port 26 formed in the outer end plate of outer housing 22, which connects separator 10 to fluid exhaust line 5 from pump 2. Inner housing 32 includes an outlet port 36, which extends through outer housing 22. Outlet port 36 is connected to fluid line 6, which is the oil return line to heat exchanger 8. Accumulator 20 also includes an oil conduit or pipe 40, which extends parallel to inner housing 32 from the inlet port 26 through inner chamber 33. Conduit 40 has a longitudinal downward facing slot 41 at the end opposite inlet port 26, which allows the oil discharge to be deposited into inner reservoir chamber 33. A perforated inner baffle 38 is mounted vertically inside inner housing 32, which partially divides inner chamber 33. A second outer baffle 28 is mounted between outer housing 22 and inner housing 32 to partially divide outer reservoir chamber 23. Inner housing 32 has an upward facing opening or vent 35 formed near the inlet (proximal) end of the cylinder wall. Outer housing 22 also includes an oil fill port 30, which is positioned directly above vent 35. Oil fill port 30 allows the sealant oil to be manually poured into inner reservoir chamber 33 for use in the operation of pump 2. An oil level gauge 44 (shown in FIG. 1 only) is mounted to outer housing 22, which provides a visual indication of the oil level within inner reservoir chamber 33. Outer housing 22 includes a second outlet port 29 located on the bottom side of the outer cylinder wall, which acts as a scavenger port to return collect oil to oil seal system 4. Inner housing 32 also includes a drain port 39 which extends through outer housing 22. Inner reservoir chamber 33 serves as the initial and primary oil collection vessel. Outer chamber 23 provides a second oil collection vessel.

Filter housing 50 includes a cylindrical filter wall 52 and a removable circular lid 56, which supports a filter element 60. Filter wall 52 includes an annular flange 54, which permits lid 56 to be attached to filter housing 50. The filter element used in separator is of conventional design and may be of the any suitable type commercially available. Typically, filter element 60 contains an oil absorbing composite mesh, which attracts and coalesces oil particulate from the oil mist. The design of filter housing 50 may be altered to accommodate different types of commercially available filter elements without changing the scope of this invention. Filter element 60 may include an outlet port (not shown) and return line for returning oil collected therein back to the oil seal system. Lid 54 includes an exhaust port 55, which vent the air into the atmosphere or into an exhaust system after the oil particulate has been recovered.

FIGS. 3–6 illustrate the operation of separator 10 and various stages of oil particulate separation. Initially, a volume of oil is added to inner reservoir chamber 33 through oil fill port 30. The supply of oil required for the operation of pump 2 provides the initial volume of oil contained in inner reservoir chamber 33. Oil is drawn out of inner reservoir chamber 33 through outlet port 36 for circulation through heat exchanger 8 and on into pump 2.

As shown in FIGS. 3 and 4, the oil discharge 100 from pump 2 flows into separator 10 through inlet port 26. The oil discharge 100 from pump 2 is heated and includes both liquid oil particles 102 and oil mist 104, which is a gaseous mixture of air and oil particulate. The liquid oil 102 and oil mist 104 travels the length of separator 10 through conduit 40 and is deposited into inner reservoir chamber 33 at the distal end of separator 10. Oil discharge 100 falls through slot 41 into inner reservoir chamber 33. The liquid oil 102 settles across the bottom of inner reservoir chamber 33, while the oil mist expands across the top of the inner reservoir chamber. The continuous flow of oil discharge into the separator causes the liquid oil and oil mist to move back toward the proximal end (front) of separator 10 through perforated baffle 38. Generally, the oil level in inner reservoir chamber 33 extends above the bottom of perforated baffle 38. Perforated baffle 38 provides a structural mechanism, which restricts and slows the flow of oil mist through the inner reservoir chamber, and which serves as a structure upon which oil particulate may condense and collect. As oil smoke passes through perforated baffle 38, a portion of gaseous oil particles condenses on the baffle. The liquid oil collected in the bottom of inner reservoir chamber 32 is used to resupply pump 2. Liquid oil 102 is drawn through outlet port 36 to heat exchanger 8 and then back to pump 2.

As shown in FIGS. 5 and 6, oil mist 104 inside inner reservoir chamber 33 is eventually vented into outer reservoir chamber 23 through opening 35 at the front end of separator 10. Because the oil discharge 100 is heated from pump 2, the collected liquid oil and oil mist creates a significantly higher ambient temperature inside inner reservoir chamber 33 than inside outer reservoir chamber 23. Consequently, venting the hot oil smoke from inner reservoir chamber 33 into the cooler outer reservoir chamber 23 results in additional condensation to remove more gaseous oil particles from the oil smoke. Once venting into outer chamber 23, oil mist 104 flows again toward the distal end of separator 20. Inside outer reservoir chamber 23, baffle 28 provides another structural mechanism, which restricts and slows the flow of oil mist through the inner reservoir chamber and which serves as a structure upon which oil particulate may condense. The oil particulate condensing in outer reservoir chamber 23 accumulates at the bottom of the chamber. The oil collected at the bottom of outer chamber 23 is reintroduced into the oil seal system through a return line (not shown) connected to outlet port 29. The remaining oil mist passes through filter element 60 to remove any remaining gaseous oil particles contained in the oil mist before the air is exhausted out exhaust port 55. Optionally, oil collected in filter element 60 may also be reintroduced to the oil seal system by a return line connected to an outlet port in the filter element itself.

One skilled in the art will recognize several advantages that the design and operation of separator 10 has over conventional air/oil separators. The multi-chambered design of separator 10 creates multiple stages of oil separation within the separator. The oil separation occurring in each stage is facilitated by the aerodynamic or thermodynamic conditions created by the multi-chambered design of the accumulator in addition to the normal oil separation created by gravitational forces within the accumulator and the coalescing of oil particles within the filter element. Heretofore, conventional separators relied on gravitation force to separate the liquid oil from the gaseous particulate within reservoir tanks, and used the oil absorbing fibers of the filter element to coalesce the oil particulate from the oil mist. The multiple stages of separation in addition to the use of the filter element in separator 10 significantly improves the oil separation over conventional separators.

The first separation stage occurs when the heated oil discharge is deposited into inner chamber 33. As the oil discharge falls through slot 41 into inner reservoir chamber 33, gravity separates the denser liquid oil from the gaseous oil mist. The heavy gaseous oil particles combine and condense separating out from the oil mist.

The second separation stage is produced by perforated baffle 38. Oil mist 104 must pass through the perforated baffle inside inner reservoir chamber 33. The baffle restricts and slows the flow of oil mist across the inner reservoir chamber. Slowing the flow of oil mist permits more oil particulate to condense before exiting inner reservoir chamber 33. Restricting the flow of mist creates turbulence that further enhances condensation of the oil particulate. In addition, baffle 38 provides a metal surface (the first mechanical structure within the separator) upon which gaseous oil particles can condense.

The third stage of particulate separation is created by venting oil mist 104 through opening 35 from inner chamber 33 into outer chamber 23. This separation stage is greatly facilitated by the thermodynamic conditions created by the multi-chambered design of separator 10. Since the ambient temperature inside the outer chamber is significantly less than the ambient temperature inside the inner chamber, venting the oil smoke into the outer chamber cools the oil smoke lowering its saturation point and thereby inducing additional condensation to the cooler metal surface of outer housing 22.

The fourth separation stage is produced by baffle 28. Baffle 28 provides the same function in the separation process as perforated baffle 38. Baffle 28 redirects and slows the flow of oil mist across the outer reservoir chamber to promote particulate condensation. In addition, baffle 28 provides a metal surface (the first mechanical structure within the separator) upon which gaseous oil particles can condense and collect.

The fifth and final separation stage comes in the form of the conventional filter element. The remaining oil particles coalesce on the fibers of the filter element and are collected for introduction to the oil seal system.

It should also be noted that the flow of oil mist through separator 10 has multiple direction changes due to the multi-chamber design of the accumulator. The oil discharge 100 travels the entire length of the separator before it enters the inner reservoir chamber at its distal end. Then, the oil mist travels back towards the proximal end of the separator inside the inner reservoir chamber before being venting into the outer reservoir chamber. Once in the outer reservoir chamber, the oil mist travels back toward the distal end of the separator before being vented upward through the filter element. While the flow of the oil mist moves back and forth within the separator, it must also pass through and around the baffles in both the inner and outer reservoir chambers. These multiple direction changes slow the flow rate of the oil mist and create turbulence within the separator, which all contributes to improved oil separation.

It is understood that the above description does not limit the invention to the details given, but may be modified within the scope of the following claims.

I claim:

1. An air/oil separator used as part of a closed loop oil seal system for a vacuum pump, which separates and collects oil particulate from the oil discharge, generated by the operation of the vacuum pump, where the oil discharge includes liquid oil and gaseous oil mist, the separator comprising:

a multi-chambered accumulator for receiving the oil discharge from the pump and accumulating liquid oil separated from the oil discharge, a filter element mounted to and in communication with the accumulator for removing the remaining portion of the oil particulate from the oil mist passed through the accumulator, and outlet means for returning liquid oil collected in the separator to circulation in the oil seal system, the accumulator including an outer housing defining a first reservoir chamber for collecting liquid oil condensed from the oil mist, an inner housing disposed within the outer housing and defining a second reservoir chamber for collecting liquid oil separated from the oil discharge deposited therein, means extending into the inner housing for depositing the oil discharge from the pump into the second reservoir chamber, and means formed in said inner housing for venting oil mist deposited from the oil discharge from the second reservoir chamber into the first reservoir chamber.

2. The separator of claim 1 wherein said inner housing includes means for restricting and slowing the flow of oil mist through said second reservoir chamber, thereby facilitating increased oil separation.

3. The separator of claim 2 wherein said flow restricting and slowing means is a baffle mounted within said inner housing.

4. The separator of claim 3 wherein said baffle also constitutes structural means upon which oil particulate may condense to facilitate oil separation within said second reservoir chamber.

5. The separator of claim 1 wherein said outer housing includes means for restricting and slowing the flow of oil mist through said first reservoir chamber, thereby facilitating increased oil separation.

6. The separator of claim 5 wherein said flow restricting and slowing means is a baffle mounted within said outer housing.

7. The separator of claim 6 herein said baffle also constitutes structural means upon which oil particulate may condense to facilitate oil separation within said first reservoir chamber.

8. The separator of claim 1 wherein the first reservoir chamber has an internal ambient temperature and the second reservoir chamber has an internal ambient temperature greater than the ambient temperature of the first reservoir chamber, whereby the difference in ambient temperatures between the first and second reservoir chambers promotes oil particulate condensation when the oil mist is vented through the venting means from the second reservoir chamber into the first reservoir chamber.

9. The separator of claim 1 wherein said oil discharge depositing means is an elongated conduit extending into the inner housing and across the second reservoir chamber, the conduit has an elongated slot through which the oil discharge is introduced into the second reservoir chamber.

10. The separator of claim 9 wherein the outer housing and inner housing each have elongated configurations and proximal and distal ends, the slot in the conduit deposits the oil discharge within the second reservoir chamber at the distal end of the inner housing, the venting means is located at the proximal end of the inner housing, and the filter element is located at the distal end of the outer housing, whereby the locations of the slot, the venting means, and the filter element facilitate the change in direction for the flow of the oil mist through the separator, which thereby improves oil separation.

11. In an oil seal system for a vacuum pump, a method for separating oil particulate from the oil discharge created by a vacuum pump, where the oil discharge includes both liquid oil and gaseous oil mist, using an air/oil separator, which includes a multi-chambered accumulator, and a filter element, the accumulator having an outer housing defining a first reservoir chamber and an inner housing disposed within the outer housing defining a second reservoir chamber, the method comprising the following steps:

a. depositing the oil discharge directly into the second reservoir chamber, b. separating liquid oil and the gaseous oil mist from the oil discharge within the second reservoir chamber using gravitational force;

c. separating a portion of the oil particulate from the oil mist within the second reservoir chamber via condensation;

d. venting the oil mist from the second reservoir chamber into an outer reservoir chamber;

e. separating a portion of the oil particulate from the oil mist within the first reservoir chamber by condensation;

f. coalescing the remaining portion of oil particulate contained in the oil mist passed through the accumulator inside the filter element.

12. The method of claim 11 wherein the oil separation of step e) is facilitated by the second reservoir chamber having an internal ambient temperature greater than the ambient temperature of the first reservoir chamber, such that as the oil mist is vented from the second reservoir chamber into the first reservoir chamber, the difference in ambient temperatures between the first and second reservoir chambers induces oil particulate condensation within the first reservoir chamber.

13. The method of claim 11 wherein the oil separation of step c) includes restricting and slowing the flow of oil mist through the second reservoir chamber, which allows time for the oil particulate to condense within the second reservoir chamber.

14. The method of claim 11 wherein the oil separation of step e) includes redirecting and slowing the flow of oil mist through the first reservoir chamber, which allow time for the oil particulate to condense within the first reservoir chamber.

15. The method of claim 11 wherein the oil separation of step d) includes changing the direction of the flow of oil mist between the second reservoir chamber and the first reservoir chamber.

16. An air/oil separator used as part of a closed loop oil seal system for a vacuum pump, which separates and collects oil particulate from the oil discharge, generated by the operation of the vacuum pump, where the oil discharge includes liquid oil and gaseous oil mist, the separator comprising:

a multi-chambered accumulator for receiving the oil discharge from the pump and accumulating liquid oil separated from the oil discharge, the accumulator including an elongated cylindrical outer housing defining a first reservoir chamber for collecting liquid oil condensed from the oil mist and having a first outlet port connectable to the oil seal system for recirculating oil collected within the first reservoir chamber, an elongated cylindrical inner housing disposed within the outer housing defining a second reservoir chamber for collecting liquid oil separated from the oil discharge deposited therein, the inner housing having a vent at its proximal end for venting oil mist deposited from the oil discharge from the second reservoir chamber into the first reservoir chamber and a second outlet port connectable to the oil seal system for recirculating oil collected in the second reservoir chamber, an elongated tubular conduit deposited within the inner housing and extending across the length of the second reservoir chamber, the conduit having an elongated slot formed at its distal end for depositing the oil discharge from the pump into the second reservoir chamber, a perforated baffle mounted inside inner housing, and a baffle mounted between outer housing and inner housing to partially dividing the first reservoir chamber, and a filter housing connected to the accumulator and a filter element supported within the filter housing and in communication with oil mist passed from the accumulator.

* * * * *